Nov. 12, 1963   G. ELLIOTT ETAL   3,110,388
LIVE POULTRY CONVEYOR AND COUNTER
Filed May 8, 1961   3 Sheets-Sheet 1

George Elliott
Carmen S. Weaver
Solomon P. Scholl
INVENTORS

George Elliott
Carmen S Weaver
Solomon P. Scholl
INVENTORS

Nov. 12, 1963

G. ELLIOTT ETAL 3,110,388

LIVE POULTRY CONVEYOR AND COUNTER

Filed May 8, 1961

George Elliott
Carmen S. Weaver
Solomon P. Scholl
INVENTORS

| United States Patent Office | 3,110,388
| --- | --- |
| | Patented Nov. 12, 1963 |

3,110,388
LIVE POULTRY CONVEYOR AND COUNTER
George Elliott, Rte. 4, Springdale, Ark., and Carmen S. Weaver, Rte. 2, and Solomon P. Scholl, Rte. 6, both of Fayetteville, Ark.
Filed May 8, 1961, Ser. No. 108,339
7 Claims. (Cl. 198—43)

This invention relates to a novel and useful live poultry conveyor and counter and is specifically adapted to facilitate the counting of fowl and the placement of predetermined numbers of fowl into poultry coops.

This invention relates to an apparatus for catching, moving, controlled loading and counting of poultry and utilizes an instinctive characteristic and behaviour of poultry which includes tendency of fowl to remain stationary and motionless when disposed upon a moving object.

It has been found that fowl will normally remain motionless and stationary when positioned on a moving object and accordingly, live poultry may be readily handled by means of conventional belt-type endless conveyors.

The present established procedure in catching, loading and counting of poultry that are to be transported from a poultry house to market is to catch the birds by hand and stuff them into coops which are then loaded on a truck or other conveying vehicle. Such procedure is time consuming and inefficient. The workers handling the fowl during the process of chasing and catching the fowl are quite likely to loose accurate count of the fowl being placed in the coops. Accordingly, the number of fowl within a coop has to be constantly checked in order to insure the proper number of fowl being placed in each coop. In addition, the birds or fowl are frequently bruised and damaged by being kicked and grasped by hand and stuffed into the coops to the extent that they are rejected or downgraded in the processing plant. The presence of bruised or damaged fowl can be readily detected by plant inspections and the downgraded or rejected fowl can cause considerable financial loss to the flock owner.

A main object of this invention is therefore to provide an automatic device which will enable poultry to be caught for loading without the necessity of individual restraint or manual handling of the fowl.

A further object of this invention, in accordance with the immediately preceding object, is to provide a device which will automatically convey the fowl which have been caught to a counter capable of accurately counting the caught fowl.

Still another object of this invention is to provide an automatic device which will enable poultry to be loaded for transportation to market without further individual restraint or manual handling of the fowl.

Yet another object of this invention is to provide a device which will provide a more humane handling of poultry during the transportation from the farm to a market.

Another object of this invention is to provide a means for automatically discharging a predetermined number of fowl into poultry coops to be shipped to market.

A still further object of this invention is to provide a conveyor means for conveying the caught poultry to the counting means which is constructed in a manner whereby individual fowl will be supplied to the counting means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
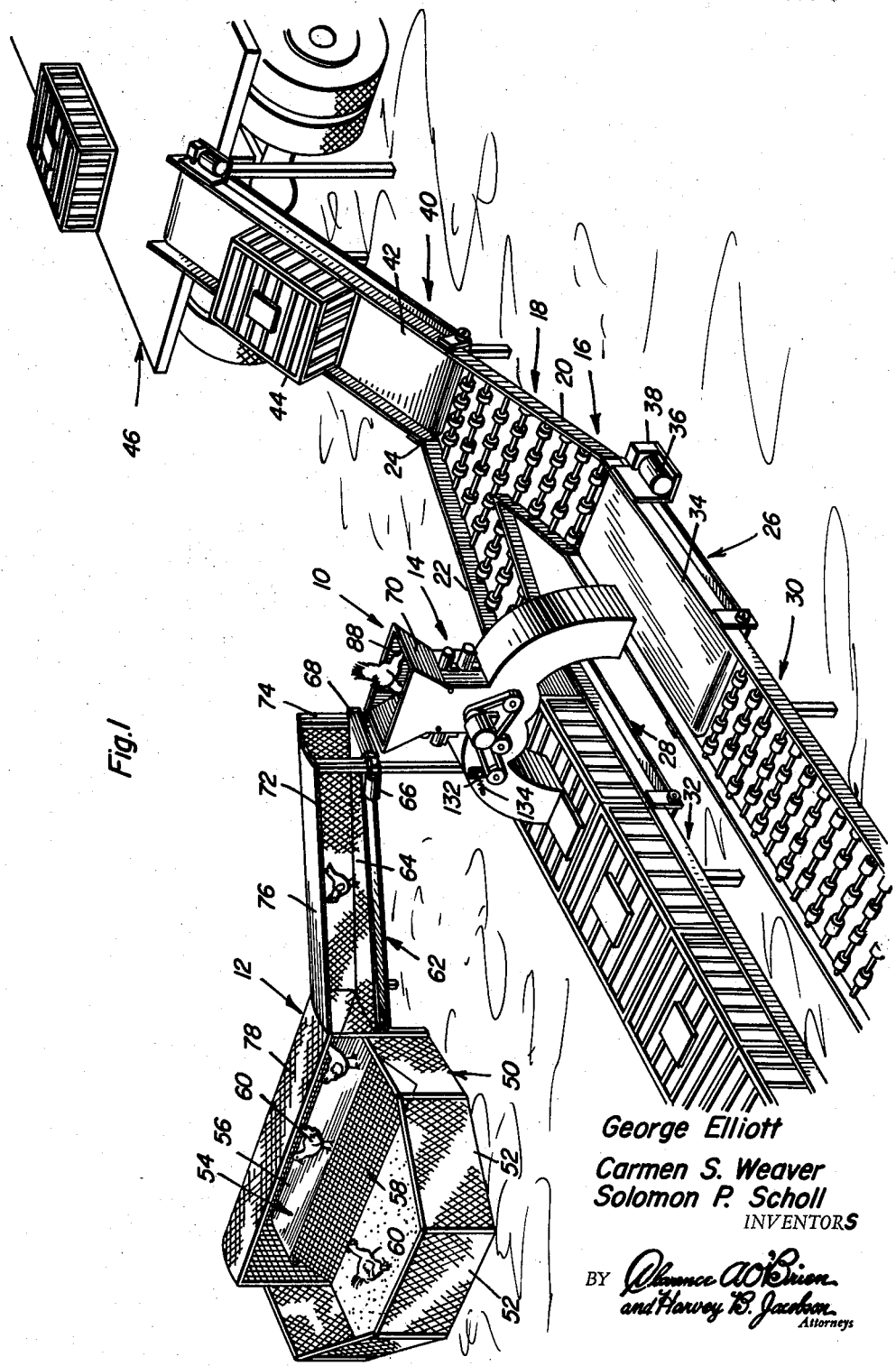
FIGURE 1 is a perspective view of the live poultry conveyor and counter of the instant invention showing the manner in which live poultry may be caught, conveyed to a counter, discharged from the counter in predetermined numbers into poultry coops and loaded upon a transportation vehicle.

Referring, more specifically to the drawings, the numeral 10 generally designates a poultry conveyor and counter of the instant invention which includes a catching and conveying mechanism generally referred to by the reference numeral 12, a counting and discharging mechanism generally referred to by the reference numeral 14 and a conveying mechanism generally referred to by reference numeral 16.

The conveying mechanism 16 includes a generally horizontal V-shaped roller skate wheel conveyor section generally referred to by the reference numeral 18 which includes two leg portions 20 and 22 that are joined at corresponding ends to form an outlet as at 24. A pair of motorized endless flexible belt-type conveyor assemblies generally referred to by reference numerals 26 and 28 and their discharge ends aligned with the inlet ends of the legs 20 and 22 respectively of the conveyor mechanism 16, and have a pair of generally horizontal roller skate wheel conveyor assemblies 30 and 32 aligned with their inlet ends. Each of the motorized endless flexible belt conveyors 26 and 28 includes an endless flexible belt 34 and a motor 36 having an actuating control 38 operatively connected thereto.

The outlet end of the conveyor mechanism 16 is in registry with the inlet end of a motorized endless flexible belt conveyor generally referred to by the reference numeral 40 which includes an endless flexible belt 42 for conveying the poultry coops 44 up the inclined conveyor 40 and onto the conveying vehicle generally referred to by the reference numeral 46.

The catching and conveyor mechanism 12 includes a pen generally referred to by the reference numeral 50 comprised of a plurality of fence sections 52. One side of the pen 50 is open and a conveyor mechanism generally referred to by reference numeral 54 is disposed across the open side of the pen 50 and includes an endless flexible belt 56. The upper reach of the endless flexible belt 56 is elevated above the flooring of the pen 50 and a reticulated ramp or flap 58 is provided to enable the fowl 60 to climb onto the endless flexible belt 56 when herded toward the conveyor 54. It is to be noted that the conveyor 54 is provided with an outlet end in alignment with a conveyor assembly generally referred to by the reference numeral 62 which includes an endless flexible belt 64 that is driven by means of a motor 66. Further, it is to be noted that the endless flexible belt 64 is driven at a greater speed than the endless flexible belt 56. The endless flexible belt 56 may be drivingly connected to a motor similar to the motor 66 or it may be drivingly connected to the conveyor assembly 62 by means of suitable gearing in order to be driven by the motor 66 at a reduced speed relative to the conveyor assembly 62.

The outlet 68 of the conveyor assembly 62 is in registry with the flared open top portion 70 comprising the inlet of the counting and discharging mechanism 14. It will be noted that each of the conveyor assemblies 54 and 62 is provided with screen-like side panels and top panels in order that the fowl 60 being conveyed thereby may not be allowed to escape therefrom. In addition, it will be noted that the screen-like sides 72 and 74 of the conveyor assembly 62 are convergent toward the outlet 68 of the conveyor 62 in order that the fowl 60 conveyed by the assembly 62 will be discharged singly therefrom and into the flared portion 70 of the counting and discharging mechanism 14.

The various conveyor assemblies set forth hereinbefore may be provided with any suitable support means for supporting and elevating the conveyor assemblies above the support surfaces disposed immediately therebelow. In addition, the top panels 76 and 78 of the conveyor assemblies 62 and 54 respectively may also be provided with an opaque material covering so as to darken the areas immediately above the endless flexible belts 56 and 64.

Figure 2:
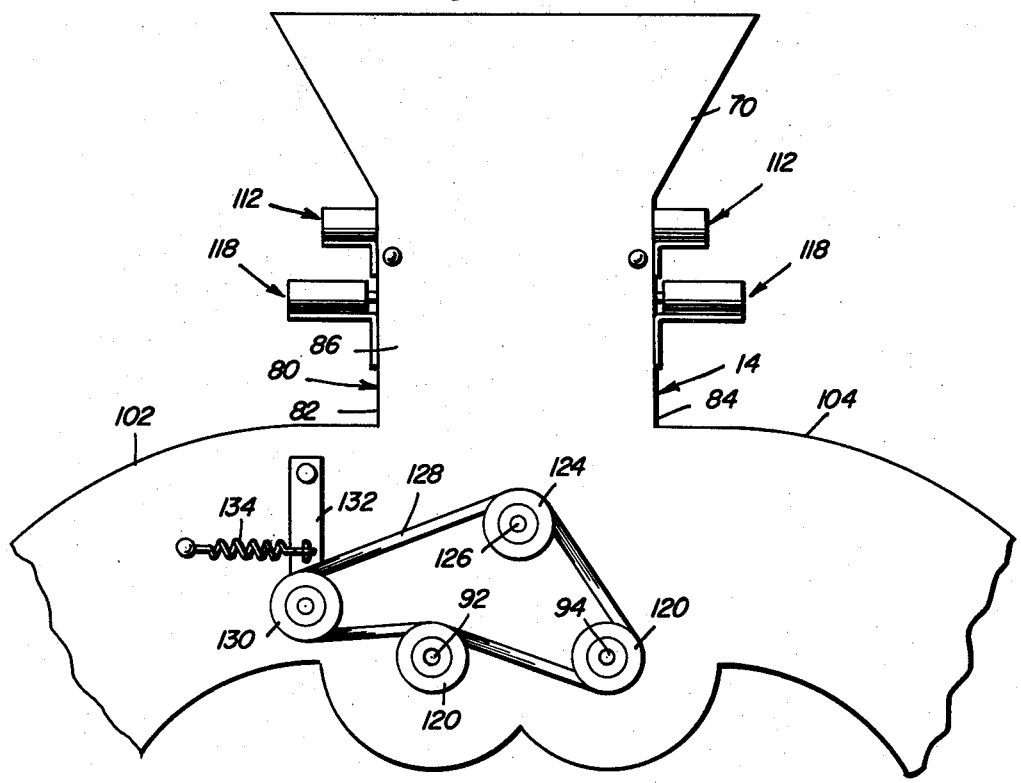
FIGURE 2 is an end elevational view of the hopper by which the fowl are counted and discharged through predetermined discharge chutes for disposition in preselected poultry coops.
Figure 5:
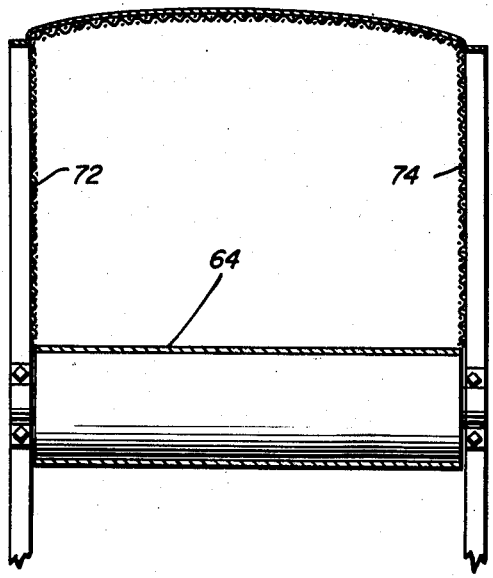
FIGURE 5 is a transverse sectional view on somewhat of an enlarged scale of a portion of the conveyor means by which the poultry is conveyed to the hopper illustrated in FIGURES 2 through 4.
Figure 3:
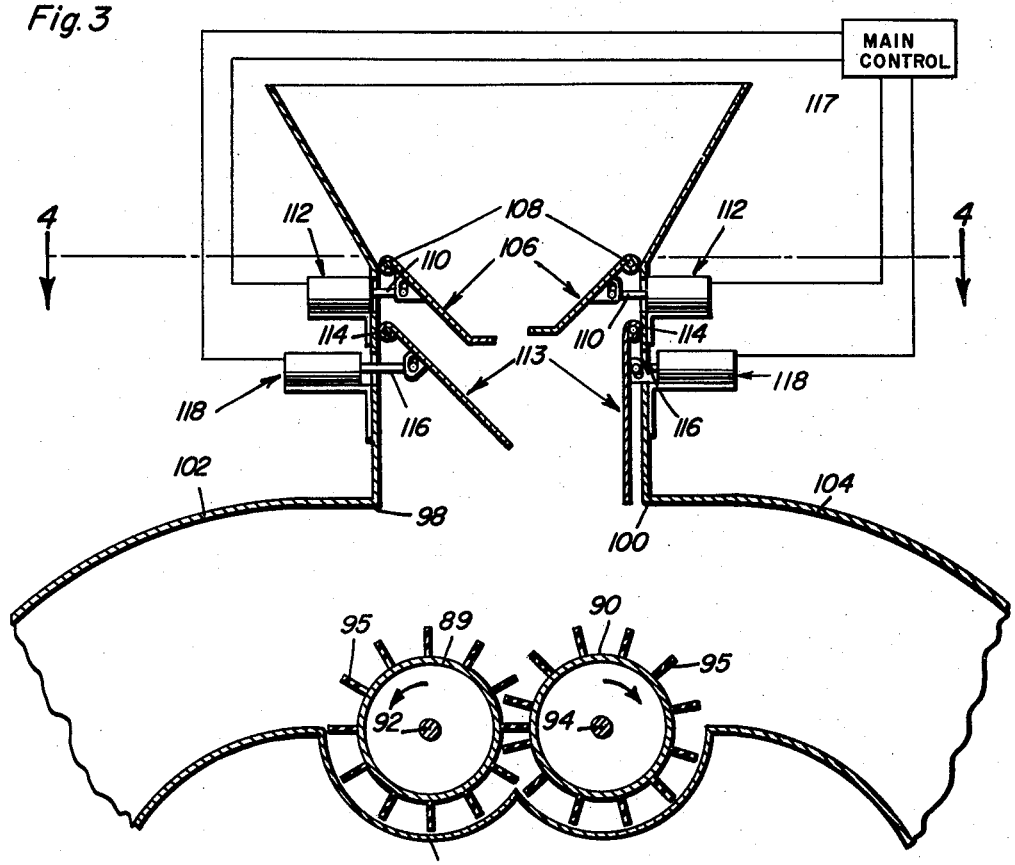
FIGURE 3 is a transverse vertical sectional view of the hopper illustrated in FIGURE 2 with the main control shown schematically.
Figure 4:
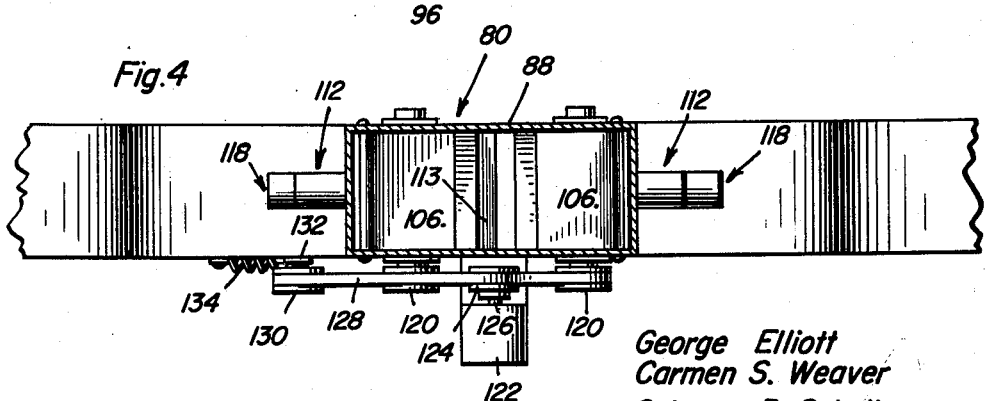
FIGURE 4 is a horizontal sectional view taken substantially upon a plane indicated by the section line 4—4 of FIGURE 3.

The flared upper portion 70 comprises the inlet for the hopper of the counting and discharging mechanism 14 which is generally designated by the reference numeral 80. The hopper 80 includes opposite side walls 82 and 84 which are interconnected by means of end walls 86 and 88. With attention now directed to FIGURES 2 through 4 of the drawings, it will be noted that a pair of drums 89 and 90 are journalled in the lower portion of the housing 80 for rotation about longitudinally extending and generally parallel axes by means of shafts 92 and 94 respectively rotatably journalled in the opposite end walls 86 and 88.

Each of the drums 89 includes a plurality of radially extending poultry engaging elements or ribs 95 which are constructed of resilient material. It will be noted that the drums 89 and 90 are disposed in side by side relation and that the bottom wall 96 of the housing 80 is contoured to closely underlie the drums 89 and 90. The housing 80 is provided with a pair of outlet openings 98 and 100 which comprise inlets for a pair of downwardly and outwardly inclined discharge chutes 102 and 104 respectively. The outlet ends of the discharge chutes 102 and 104 are disposed in vertically spaced relation to and in vertical alignment with the motorized endless flexible belt conveyors 26 and 28. Whereby fowl 60 being discharged through the chutes 102 and 104 may be directed into coops 44 stationarily positioned on the conveyors 26 and 28.

A counting means including a pair of fall checking flaps generally referred to by the reference numerals 106 are provided in the upper portion of the housing 80. Each of the flaps 106 is mounted for pivotal movement about an axis extending longitudinally of the housing 80 by means of a pivot shaft 108 and each of the flaps 106 is normally urged toward a downwardly inclined and transversely extending position such as that illustrated in FIGURE 3 of the drawings by means of a spring urged actuating shaft 110. The actuating shaft 110 is operatively connected to a counting mechanism generally referred to by the reference numeral 112 and the counting mechanisms 112 may be operatively connected to a main control 117 for actuating the actuators 38 of the motors 36 in response to a predetermined number of oscillating movements of the flaps 106 caused by fowl being discharged into the hopper 80 from the conveyor assembly 62 and engaging the flaps 106.

In addition to the fall checking and counting flaps 106, a pair of fall retarding and deflecting flaps generally referred to by the reference numerals 113 are provided and are also mounted for pivotal movement about axes extending longitudinally of the housing 80 by means of pivot shafts 114. Each of the fall retarding and deflecting flaps 113 is operatively connected to an operating rod 116 carried by an actuator generally referred to by reference numeral 118 and the actuators 118 are operable in response to the main control 117 with which the counter mechanisms 112 are connected in order that the actuators 118 may be successively and alternately actuated in response to actuation of the counting mechanisms 112. This actuation of the actuators 118, if so desired, can be effected in the manner shown in U.S. Patent No. 2,541,376 wherein upon the counting of a predetermined number of impulses, by the counter 112, a circuit is closed and the actuators 118 are actuated. However, any other conventional means may be used.

Each of the shafts 92 and 94 is provided with a drive pulley 120 disposed exteriorly of the hopper 80 and is drivingly connected to a motor 122 having a pulley 124 secured to the output shaft 126 thereof by means of an endless flexible belt 128 which is disposed about the pulleys 120 in a manner to drive one pulley in one direction and the other pulley 120 in the opposite direction, see FIGURE 1. The endless flexible belt 128 is also entrained about a tensioning pulley 130 which is movably mounted on the hopper 80 by means of a pivot arm 132 and normally urged to a belt tightening position by means of spring 134. In operation, the fowl 60 are herded up the flap 58 and onto the endless flexible belt 56 of the conveyor assembly 54. As the fowl 60 moves onto the accelerated conveyor assembly 62, they are spaced apart and they are discharged from the outlet 68 of the conveyor assembly 62 singly and into the flared upper portion 70 of the housing 80. The poultry 60 engage either one of the counting flaps 106 and at the same time the fall of the fowl is partially checked. Each time one of the flaps 106 is engaged the corresponding counter mechanism 112 registers an additional fowl and after a predetermined number of fowl have been counted the extended fall retarding and deflecting flap 113 may be retracted by means of the corresponding actuator 118 and the other flap 113 may be extended. Each flap 113 will deflect the fowl handled by the hopper 80 toward the opposite outlet opening 98 or 100 whereupon the corresponding drum will engage the fowl and discharge the same from the hopper 80 and into the corresponding discharge chute 102 or 104. The descent of each fowl through the hopper is at least partially checked by engagement of the fowl with the fall checking and counting flaps 106 and the fall retarding and deflecting flap 113 disposed in the operative position. Accordingly, each fowl being handled by the counting and discharging mechanism 14 is handled in a humane manner and in a manner which will prevent the fowl from becoming bruised and otherwise injured. As the fowl are discharged through the discharge chutes 102 and 104 they will fall into corresponding coop 44 disposed immediately therebelow. After a predetermined number of fowl 60 has been discharged into a selected coop 44, the motorized endless flexible belt conveyor supporting that coop 44 may be actuated upon a signal from the main control to which the actuator 38 of the conveyor and the counter mechanisms 112 are connected in order that that coop may be discharged from the motorized endless flexible belt conveyor and onto the conveyor mechanism 16 whereupon it will move toward the outlet 24 thereof and onto the conveyor 40.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A live poultry counter and conveyor comprising an open top hopper adapted to intermittently receive through the open top thereof comprising the inlet therefor individual fowl, said hopper having a plurality of outlet openings formed in the lower portion thereof, counter means having an actuator in the upper portion of said hopper actuated by fowl being received in the hopper for counting fowl being introduced thereinto, and deflecting means in said hopper engaged by fowl received in said hopper and operable in response to actuation of said counting means for directing fowl toward a selected one of said outlet openings said counter means actuator including at least one fall checking flap mounted in said hopper for swinging movement in response to fowl falling thereon, between a depending retracted position and a transversely extending operative position, means normally yieldingly urging said flap toward said operative position.

2. The combination of claim 1 including a pair of contra-rotating drums provided with generally radially projecting fowl engaging elements, said outlet openings equalling two in number and being disposed on opposite sides of said hopper, said drums being disposed in side-by-side relation in said hopper and journalled for rotation about generally parallel axes extending longitudinally of said hopper, a pair of fowl fall retarding and deflecting flaps disposed in said hopper between said counter means and said drums and mounted for swinging movement on opposite sides of said hopper between depending retracted positions and downwardly inclined transversely extending operative positions for deflecting fowl to the remote sides of said drums, said outlet openings registered with the remote sides of said drums and each defining the inlet of a downwardly and outwardly inclined discharge chute, said deflecting flaps including actuating means alternately operable in response to actuation of said counter means a predetermined number of times.

3. The combination of claim 1 including conveyor means having an inlet end adapted to receive groups of fowl and an outlet end in registry with the inlet of said hopper, said conveyor means including means for successively increasing the speed of movement of the fowl being conveyed whereby said fowl may be discharged from said outlet end one at a time.

4. The combination of claim 3 including a pair of contra-rotating drums provided with generally radially projecting fowl engaging elements, said outlet openings equalling two in number and being disposed on opposite sides of said hopper, said drums being disposed in side-by-side relation in said hopper and journalled for rotation about generally parallel axes extending longitudinally of said hopper, a pair of fowl fall retarding and deflecting flaps disposed in said hopper between said counter means and said drums and mounted for swinging movement on opposite sides of said hopper between depending retracted positions and downwardly inclined transversely extending operative positions for deflecting fowl to the remote sides of said drums, said outlet openings registered with the remote sides of said drums and each defining the inlet of a downwardly and outwardly inclined discharge chute, said deflecting flaps including actuating means alternately operable in response to actuation of said counter means a predetermined number of times, motor means, and drive means drivingly connecting said motor means to said drums.

5. The combination of claim 3 including a pen in communication with the inlet end of the conveyor means whereby said fowl may be herded into the inlet end of said conveyor.

6. The combination of claim 1 including a pair of contra-rotating drums provided with generally radially projecting fowl engaging elements, said outlet openings equalling two in number and being disposed on opposite sides of said hopper, said drums being disposed in side-by-side relation in said hopper and journalled for rotation about generally parallel axes extending longitudinally of said hopper, a pair of fowl fall retarding and deflecting flaps disposed in said hopper between said counter means and said drums and mounted for swinging movement on opposite sides of said hopper between depending retracted positions and downwardly inclined transversely extending operative positions for deflecting fowl to the remote sides of said drums, said outlet openings registered with the remote sides of said drums and each defining the inlet of a downwardly and outwardly inclined discharge chute, said deflecting flaps including actuating means alternately operable in response to actuation of said counter means a predetermined number of times, motor means, and drive means drivingly connecting said motor means to said drums.

7. The combination of claim 1 including a pair of contra-rotating drums provided with generally radially projecting fowl engaging elements, said outlet openings equalling two in number and being disposed on opposite sides of said hopper, said drums being disposed in side-by-side relation in said hopper and journalled for rotation about generally parallel axes extending longitudinally of said hopper, a pair of fowl fall retarding and deflecting flaps disposed in said hopper between said counter means and said drums and mounted for swinging movement on opposite sides of said hopper between depending retracted positions and downwardly inclined transversely extending operative positions for deflecting fowl to the remote sides of said drums, said outlet openings registered with the remote sides of said drums and each defining the inlet of a downwardly and outwardly inclined discharge chute, said deflecting flaps including actuating means alternately operable in response to actuation of said counter means a predetermined number of times and conveyor means having an inlet end adapted to receive groups of fowl and an outlet end in registry with the inlet of said hopper, said conveyor means including means for successively increasing the speed of movement of the fowl being conveyed whereby said fowl may be discharged from said outlet end one at a time.

References Cited in the file of this patent
UNITED STATES PATENTS

| | | |
|---|---|---|
| 2,234,208 | Thompson et al. | Mar. 11, 1941 |
| 2,541,376 | Nelson | Feb. 13, 1951 |
| 2,645,424 | Wright | July 14, 1953 |
| 2,840,224 | Lefief | June 24, 1958 |